UNITED STATES PATENT OFFICE.

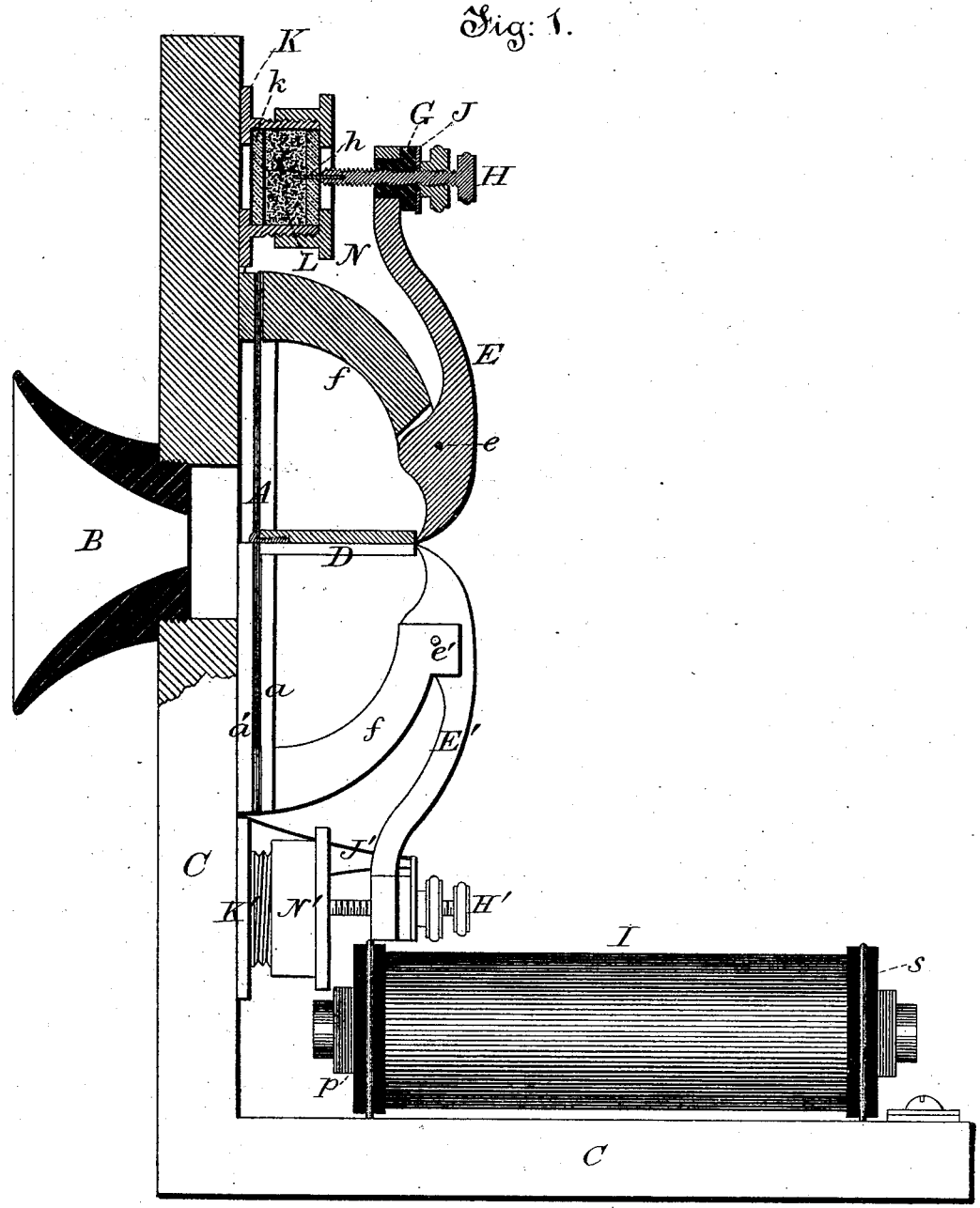

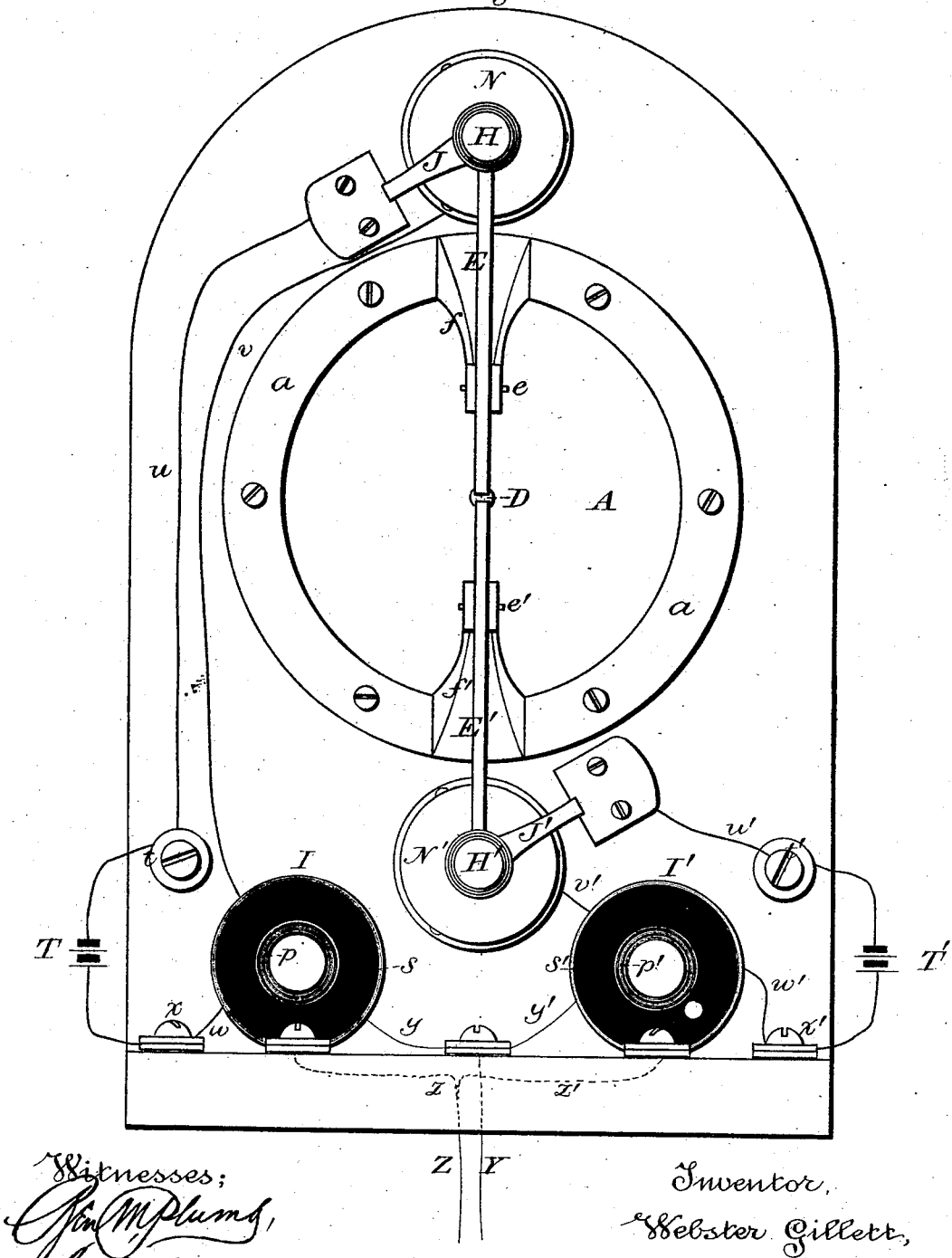

WEBSTER GILLETT, OF BROOKLYN, NEW YORK.

TRANSMITTER FOR SPEAKING-TELEPHONES.

SPECIFICATION forming part of Letters Patent No. 237,856, dated February 15, 1881.

Application filed November 4, 1880. (No model.)

*To all whom it may concern:*

Be it known that I, WEBSTER GILLETT, a citizen of the United States residing at Brooklyn, in the county of Kings and State of New York, have invented certain new and useful Improvements in Transmitters for Speaking-Telephones; and I do hereby declare the following to be a full, clear, and exact description thereof, reference being had to the accompanying drawings.

My invention relates to that class of telephonic transmitters which consist, in general, of a variable resistance included in an electric circuit, the variations of which resistance are controlled by and dependent upon the rhythmical vibrations of a diaphragm or resonant plate in response to the action of sound-waves traversing the atmosphere.

My improvements consist, first, in combining two or more induction-coils having their secondary wires included in a main circuit and their primary wires included in independent local circuits, with a variable resistance in each of said local circuits, and a single diaphragm which acts to vary the resistance in each local circuit simultaneously and proportionately, whereby the diaphragm, in its vibrations, is enabled to affect a greater quantity of electricity traversing the circuits under its control; second, in the combination of two or more induction-coils having their primary wires included in independent local circuits and their secondary wires included in a main circuit, a variable resistance in each of said local circuits, and a single diaphragm which acts to vary the resistances in each local circuit simultaneously and proportionately; third, in placing two or more of the said induction-coils in parallel branches of the main circuit, whereby the quantity of electricity induced in the main line at each pulsation is increased by the simultaneous action of two or more primary or local circuits.

In the accompanying drawings, Figure 1 is a side elevation, partly in section, of an apparatus embodying my improvements, and Fig. 2 is a rear view of the same in elevation.

In the figures, A represents the diaphragm of a telephonic transmitter, which is preferably of circular or disk form, rigidly clamped at its circumference between the annular rings $a\ a'$, and free to vibrate in its central portion under the influence of sound-waves which are concentrated upon it by means of the converging mouth-piece B. These parts are supported by a suitable frame, C, and in themselves are well known and present no novel features. A metallic rod, D, is secured to the center of the diaphragm A perpendicular to its plane, and consequently partakes of its movements when it is thrown into vibration. The rod D bears against the extremities of the short arms of two levers, E and E', which are respectively pivoted, at $e$ and $e'$, to curved standards $f$ and $f'$, which are preferably secured to or are formed integrally with the annular clamping-ring $a$ of the diaphragm. The longer arm of each of the said levers is provided with a collar of insulating material, as at G, through which passes an adjustable set-screw, H, terminating in a metallic pin, $h$, preferably of platinum. The same set-screw H also clamps the end of the lever E to a flexible and resilient bracket or standard, J, (see also J',) secured to the frame C, as best seen in Fig. 2. The pin $h$ projects into a mass of finely pulverized or powdered conducting material, L, such as graphite, carbon, or other similar substance, which is confined in a metallic receptacle, K, between two disks of elastic material, such as india-rubber, as shown at $k\ k$; and the powdered material is compressed and kept in place between the two disks $k\ k$ and within the receptacle K by means of the cap N, which is arranged to be screwed down upon the receptacle K, but has an aperture in its center, through which passes the pin $h$, and the latter likewise passes through the rubber disk $k$ and projects into the mass of the powdered conductor at L. This arrangement of parts constitutes a variable electric resistance.

One wire of the primary circuit of an induction-coil is connected with the standard J, and hence with the set-screw H and pin $h$. The other wire of the same circuit is connected with the metallic receptacle K, and hence with the mass of powdered conducting material placed therein. It is therefore evident that the specific resistance which the electric current meets with at any given moment in passing from the pin $h$ to the powdered conducting substance L will depend upon the number of particles of the latter which are in contact with the pin, and this, again, will depend upon the distance that the pin is thrust into the mass of the powder and the pressure which it exerts upon the particles, both of which will be increased by pressing the pin into the powder and diminished by withdrawing it. The pin $h$ will, in its longitudinal movement, reproduce the vibrations of the diaphragm A, but owing to the proportion of the arms of the lever E the amplitude of the said vibrations will be magnified, and will produce an increment and decrement of the strength of current traversing the primary circuit corresponding with the vibrations of the diaphragm A by virtue of the variations of resistance produced between the pin $h$ and the powdered conducting substance L which surrounds it.

All the apparatus hereinbefore described, with the exception of the diaphragm A and its attached rod D, is duplicated, there being two independent levers, variable resistances, and local circuits; but the description which has hereinbefore been given will serve for both, the reference-letters being the same in both, except that one set is unaccented and the other is accented. Two induction-coils, I I', are also provided, of the usual construction, each having a primary coil, as $p$, of comparatively few convolutions, and a secondary coil, as $s$, having a much greater number of convolutions, and each one of these coils is actuated by one local circuit.

The electrical connections are arranged as follows: From the pole of the local battery a wire leads to binding-screw $t$, from which a wire, $u$, proceeds to the standard J, and thence the current passes through the variable resistance to the receptacle K, and thence, by wire $v$, to the primary wire $p$ of the induction-coil I, which is connected by wire $w$ and binding-screw $x$ to the other pole of the battery. The circuit of the battery T' is arranged in the same manner with reference to the induction-coil I'. I may remark, however, that nearly as good results are obtained by the use of one local battery only and dividing its current between the two induction-coil primary circuits, in a manner well understood to those skilled in the art. The main-line wire enters at Y and divides into two branches, $y$ and $y'$, which pass through or include the secondary coils $s$ and $s'$ of the respective induction-coils I and I', after which the branch wires $z$ and $z'$ unite in a singe wire, $z$, which forms the other terminal of the main circuit.

By the arrangement of circuits and apparatus which I have described it will be understood that there are in reality two sets of transmitting apparatus actuated by a common diaphragm, but acting to re-enforce each other in their action upon the main circuit, and thus set in action a greater quantity of electricity therein than could be done with a single apparatus, by which I attain a greater volume of sound in the receiving-instrument.

I do not desire to confine myself to the use of two sets only of resistances, induction-coils, &c., as it is obvious that in some cases even a greater number might be employed with advantage, and actuated by means of a single diaphragm common to all.

I claim as my invention—

1. The combination, substantially as hereinbefore set forth, of two or more induction-coils having their primary wires included in independent local circuits, a variable resistance in each of said local circuits, and a single diaphragm or vibrating plate which acts to vary the said resistances in each local circuit simultaneously and proportionately.

2. The combination, substantially as hereinbefore set forth, of two or more induction-coils having their primary wires included in independent local circuits and their secondary wires respectively included in a main circuit common to both, a variable resistance in each of said local circuits, and a single diaphragm or vibrating plate which acts to vary the said resistances in each local circuit simultaneously and proportionately.

3. The combination, substantially as hereinbefore set forth, of two or more induction-coils having their secondary wires included in parallel branches of a main circuit and their primary wires included in independent local circuits, and a single diaphragm or vibrating plate which acts to vary the said resistances in each local circuit simultaneously and proportionately.

In testimony whereof I have hereunto subscribed my name this 3d day of November, A. D. 1880.

WEBSTER GILLETT.

Witnesses:
  BEN. M. PLUMB,
  C. C. SHARP.